United States Patent [19]

Yamagata et al.

[11] Patent Number: 4,694,736
[45] Date of Patent: Sep. 22, 1987

[54] CLEAN ROOM

[75] Inventors: Taizo Yamagata; Takaaki Uchikawa; Shinichi Yamamoto; Shinichiro Tomikawa; Yoshio Ogasahara; Masaru Sukagawa, all of Chuo, Japan

[73] Assignee: Shimizu Kensetsu Kabushiki Kaisha, Tokyo, Japan

[21] Appl. No.: 790,308

[22] Filed: Oct. 22, 1985

[30] Foreign Application Priority Data

Oct. 23, 1984 [JP] Japan ................................ 59-221320
Feb. 26, 1985 [JP] Japan ................................ 60-35286

[51] Int. Cl.$^4$ ............................................. F24F 1/02
[52] U.S. Cl. ...................................... 98/31.6; 55/472; 165/57
[58] Field of Search ...................... 98/31.5, 31.6, 34.5, 98/34.6; 165/57; 55/385 A, 472

[56] References Cited

U.S. PATENT DOCUMENTS 1,937,829 12/1933 Mack ................................. 165/57 X
3,158,457 11/1964 Whitfield ......................... 98/31.5 X

FOREIGN PATENT DOCUMENTS 148836 12/1978 Japan ..................................... 165/57
131636 10/1980 Japan ..................................... 98/34.5
155329 12/1981 Japan ..................................... 98/31.6

Primary Examiner—Harold Joyce

[57] ABSTRACT

A clean room having an air-conditioner unit built in the shell of an airtight main room in such a manner as to form part of the internal wall of the main room. This air-conditioner unit is provided with an external casing of a small thickness and this external casing is provided with an air inlet and an air outlet which is fitted with a high-performance filter. The casing has an air blower disposed therein. The airtight main room is mainly formed of a plurality of gate-shaped frames disposed in parallel as regularly spaced on a floor surface. The air-conditioner unit and a control unit are disposed in the spaces intervening between the adjacent vertical members of the gate-shaped frames. The internal wall of the main room is formed of wall panels and the front panel of the casing of the air-conditioner unit.

4 Claims, 30 Drawing Figures

FIG. I

CLEAN ROOM

BACKGROUND OF THE INVENTION

This invention relates to a clean room which has no use for a machine compartment or an inlet or outlet duct.

In the conventional clean room, a machine cubicle is installed as closely juxtaposed to an airtight main room, an air-conditioner is disposed inside the machine cubicle and, where the air circulation inside the airtight main room is of a vertical flow type, a ceiling provided with filters of high performance and a grated floor are interconnected with air inlet and outlet ducts, so that the air inside the airtight main room is circulated by means of the air-conditioner and cleaned by passage through the filters. The aforementioned air-conditioner may be any of the various types such as, for example, the type using an air blower exclusively, the type using both an air blower and a heat exchanger, and the type using a humidifier in addition to the two devices mentioned above.

The conventional clean room described above suffers from complexity of construction because it necessitates installation of facilities and devices attendant on the air-conditioner and entails numerous jobs and various sorts of labor in the distribution of pipes and ducts. Moreover, this construction consumes much time. The total space for the clean room is required to allow a space for occupation by the machine cubicle and, therefore, is liable to be larger than is otherwise sufficient.

The clean rooms now used in various industries, in terms of required cleanliness of interior air, range widely from a high level to a low level. The clean rooms used in highly technological industries engaging in assemblage of semiconductors and cultivation of microorganisms and bacteria are required to meet as high cleanliness as Class 1, whereas those used in the industries devoted to cleaning of dust-free garments and packaging of foodstuffs are only required to meet cleanliness of the level of Class 10,000 and are not expected to provide such high cleanliness as normally prevalent in the highly technological industries. The clean rooms used in special industries and expected to provide high cleanliness are primarily aimed at enhancing the quality of products and, therefore, are required to tolerate the aforementioned drawbacks inherent in the conventional clean room construction. For the clean rooms used in ordinary industries which are satisfied with low degrees of cleanliness, the conventional construction is not suitable. In recent years, the desirability of developing a clean room which is constructed inexpensively and quickly in a small space and is readily disassembled has come to find growing recognition.

DETAILED DESCRIPTION OF THE INVENTION

An object of this invention is to provide a clean room so constructed as to obviate the necessity for inlet and outlet ducts and a machine cubicle and, therefore, enjoy a saving on space. Another object of this invention is to provide a clean room such that it will be easily and quickly constructed and readily disassembled. Yet another object of this invention is to provide a clean room such that it will be freely enlarged (expanded) or reduced as occasion demand.

This invention concerns a clean room designed to keep clean the interior air of an airtight main room by circulating the air through a circulation path and an air-conditioner and filters disposed in the circulation path, which clean room is characterized by having at least one air-conditioner unit built in the shell of the room behind part of the internal wall thereof, the air-conditioner unit being provided with an external casing of a small thickness, the external casing being provided in the lower part of the room interior side thereof with an air inlet and in the upper part thereof with an air outlet fitted with a high-performance filter, the casing being further provided therein with an air blower, and the air blower being so adapted as to deliver forced air flow to the air outlet.

This invention further concerns a clean room which is characterized by comprising a plurality of gate-shaped frames disposed in parallel in a prescribed direction as regularly spaced on a floor surface, an air-conditioner unit built in at least one of spaces intervening between the vertical members of the adjacent frames and forming part of the internal wall of the room, a control unit adapted to control the air-conditioner unit and built in one of the spaces intervening between the vertical members other than the space occupied by the air-conditioner unit, wall panels for covering the spaces intervening between the vertical members of the adjacent frames other than the space occupied by the air-conditioner unit and the spaces falling within the vertical members of the frames, wall panels for covering the outer lateral parts of the frames positioned outside, a ceiling panel covering the upper open end of an airtight main room defined by the wall panels, and means for tightly sealing the interior of the airtight main room, the air-conditioner unit being provided with an external casing of small thickness, the casing being provided in the lower part of the room interior side thereof with an air inlet and in the upper part thereof with an air outlet fitted with a high-performance filter, the casing being provided therein with an air blower, and the air blower being so adapted as to deliver a forced flow of air toward the air outlet, and the control unit being provided in a thin external casing thereof with mechanical items for control.

The characteristic features of the present invention will be more fully understood from the further disclosure of this invention to be made in the following detailed description of preferred embodiments, with reference to the accompanying drawings.

DESCRIPTION OF THE PREFERRED EMBODIMENTS

Figure 1:
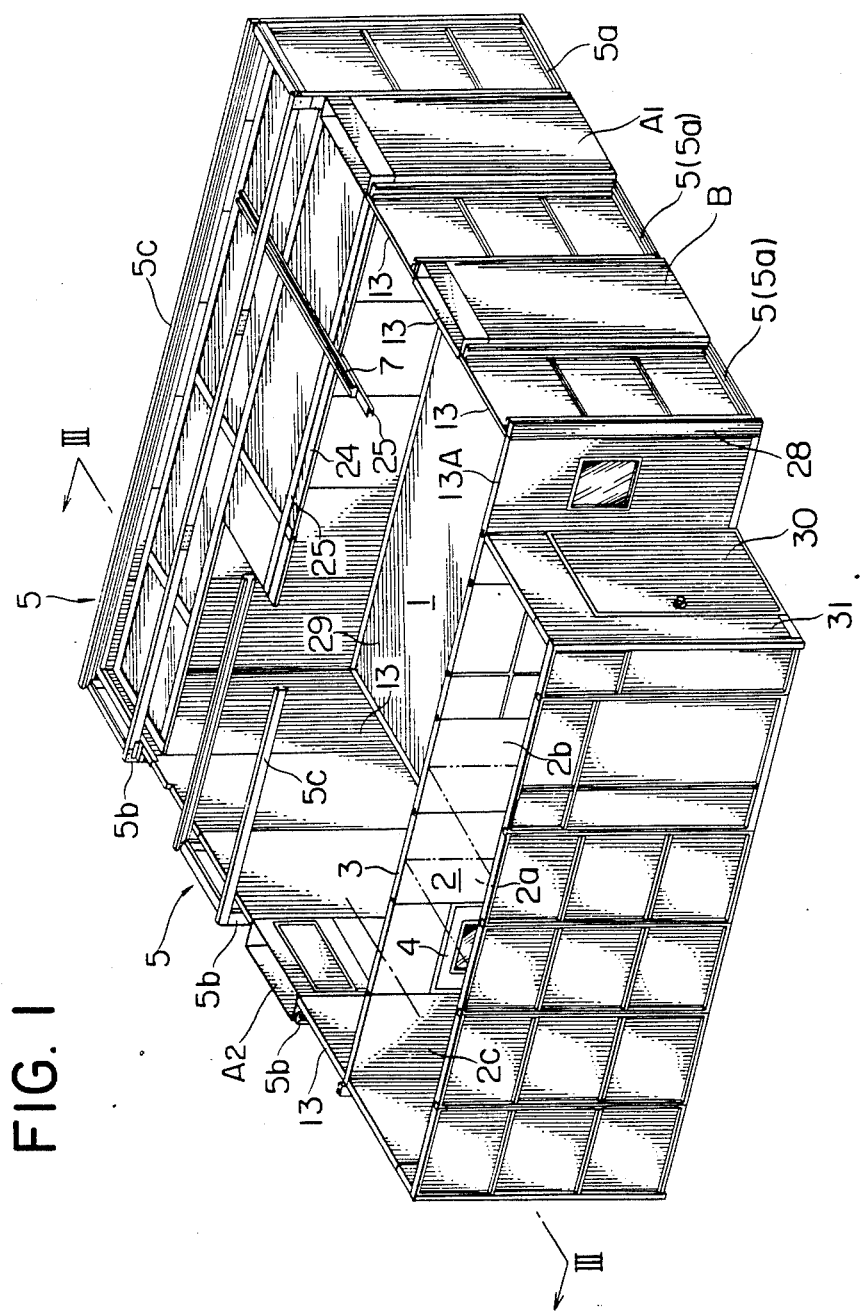
FIG. 1 is a partially omitted perspective view.

As illustrated in FIGS. 1 through 4, the clean room comprises an airtight main room 1 and a preparatory room 2 formed as adjoining the outside of the airtight main room. The preparatory room 2 has an air shower room 2a at the center thereof as interposed between an anterior room 2b falling on the righthand side and a posterior room 2c on the lefthand side respectively with respect to FIG. 1. Via a door 4 formed in a partition wall 3, the rooms 1 and 2 communicate with each other.

In the airtight main room 1, three gate-shape frames 5 are parallelly arranged as spaced at intervals of 1000 mm in the recessing direction (vertical direction in FIG. 2) of the room. These frames form main structural members of the airtight main room.

Figure 4:
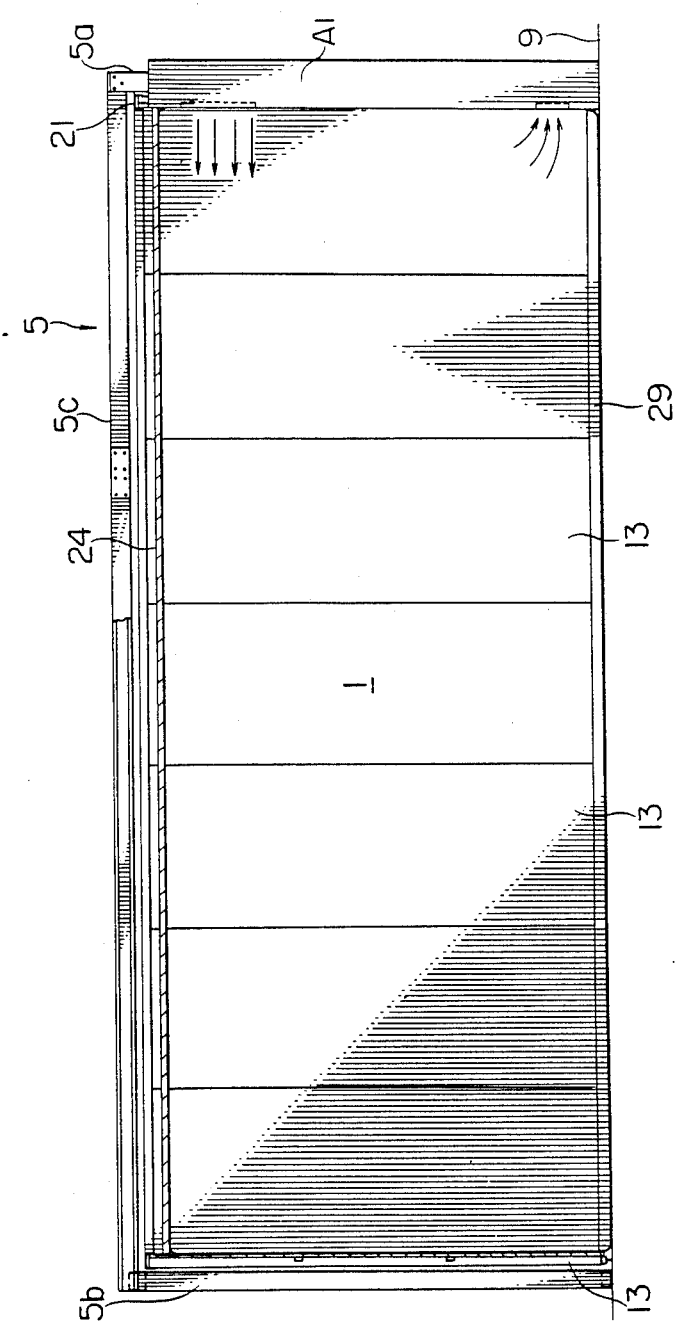
FIG. 4 is a cross section taken through FIG. 2 along the line IV—IV.
Figure 5:
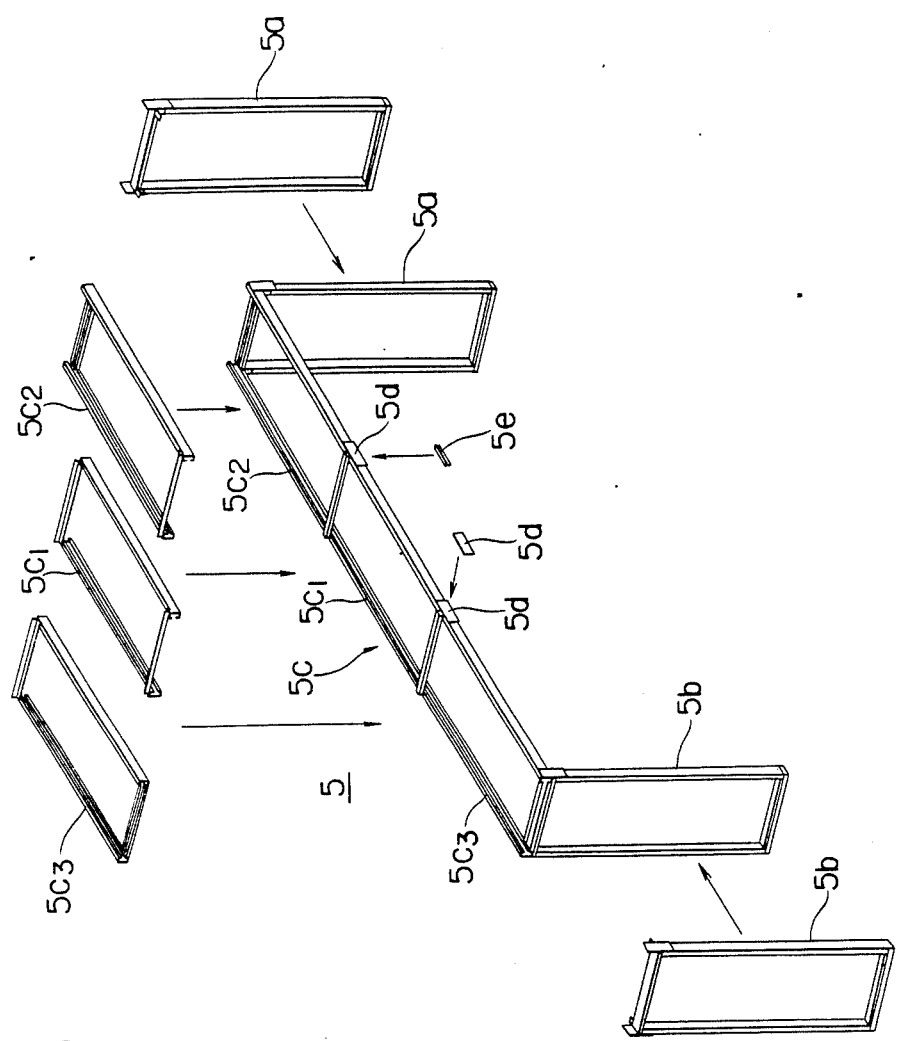
FIG. 5 is an assembly drawing and disassembly drawing of a gate-shaped frame.
Figure 6:
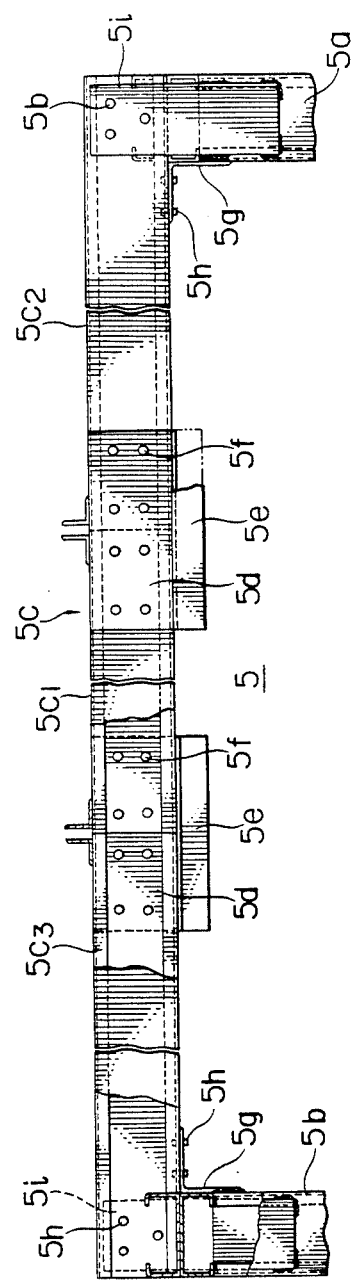
FIG. 6 is an enlarged front view of the upper part of the gate-shaped frame.
Figure 7:
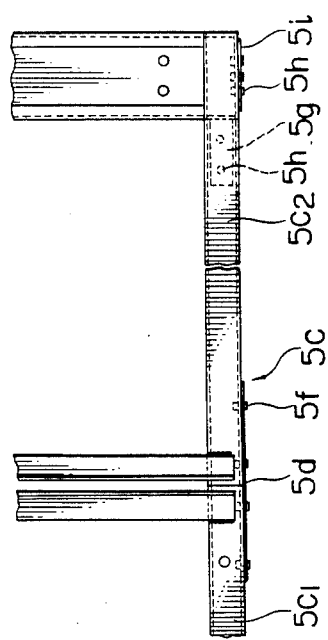
FIG. 7 is an enlarged plan view of part of the horizontal part of the gate-shaped frame.

Each of the gate-shaped frames 5, as illustrated in FIGS. 5 through 7, is obtained by joining rectangular vertical frames 5a, 5b forming the vertical members of the gate and three rectangular horizontal frames 5c1, 5c2, and 5c3 jointly forming a horizontal part 5c, i.e. the horizontal member of the gate. The gate-shaped frame 5 has a span (distance between the opposed vertical frames 5a, 5b) of 7000 mm and a height of 3000 mm. In the three horizontal frames 5c1, 5c2, 5c3, the centrally positioned horizontal frame 5c1 has its opposite edges joined to one edge each of the externally positioned horizontal frames 5c2, 5c3 by the use of connecting plates 5d, 5d, angles 5e, 5e, and bolts 5f. The other edges of the external horizontal frames 5c2, 5c3 are fastened with bolts 5h onto angles 5g, 5g attached fast to the inner sides of the upper edges of the vertical frames 5a, 5b and, at the same time, the external lateral sides of the other edges are retained on connecting plates 5i, 5i attached fast to the vertical frames and fastened with bolts 5h to the connecting plates. The horizontal parts 5c of the frames 5 are joined one to another with a continuous support member 6 (FIGS. 18, 19) disposed beneath the horizontal parts 5c and formed of channel members. The horizontal parts and the continuous support member 6 are mutually bound with clips (not shown). The continuous support member 6 has the lower side thereof keep in position a bar 7 having an M-shaped cross section (FIG. 1). Further as illustrated in FIGS. 1 through 4, in the space partitioned by the vertical frames 5a, 5a and 5b, 5b of the adjacent frames 5 (the spaces intervening between the vertical frames), a first air-conditioner unit A1 is built in as between the vertical frames on the righthand side as illustrated in FIG. 1 and a second air-conditioner unit A2 is built in as between the vertical frames on the lefthand side as illustrated in FIG. 1. A control unit B for controlling the operation of the two air-conditioner units A1, A2 is built in between the vertical frames 5a which fall on the same side as the first air-conditioner unit A1. The control unit B is juxtaposed across the vertical frame 5a to the first air-conditioner unit A1 and is opposed to the second air-conditioner unit A2 across the space of the airtight main room.

Figure 8:
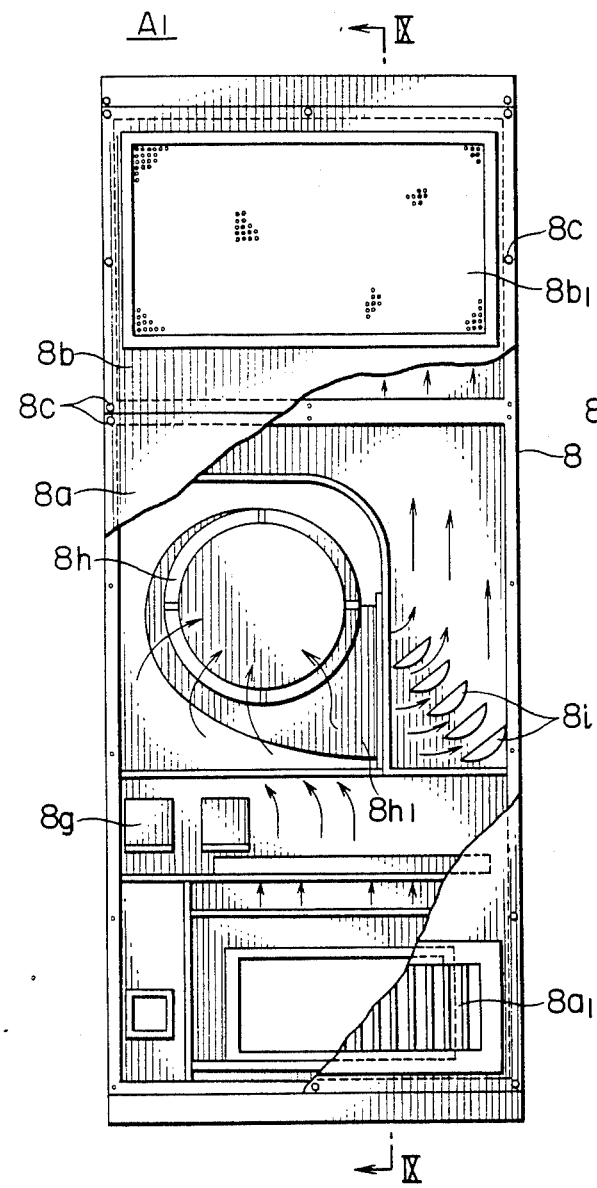
FIG. 8 is a partially cutaway front view of a first air-conditioner unit.
Figure 9:
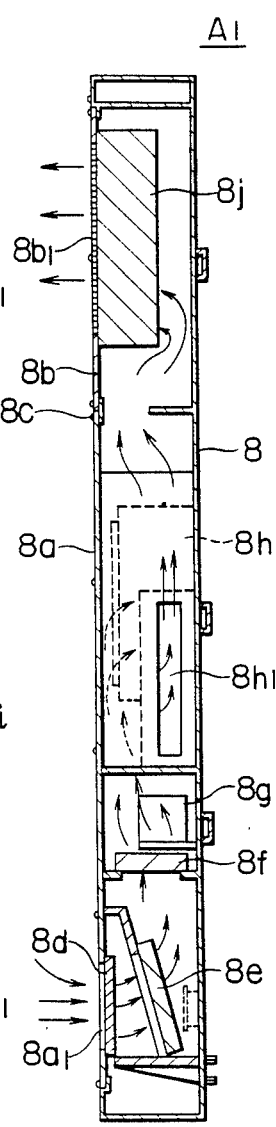
FIG. 9 is a cross section taken through FIG. 8 along the line IX—IX.

The first air-conditioner unit A1, as illustrated in FIGS. 8 and 9, is provided with an external casing 8 measuring about 2730 mm in height, 995 mm in width, and 250 mm in thickness. This casing 8 is lined with glass wool.

Figure 10:
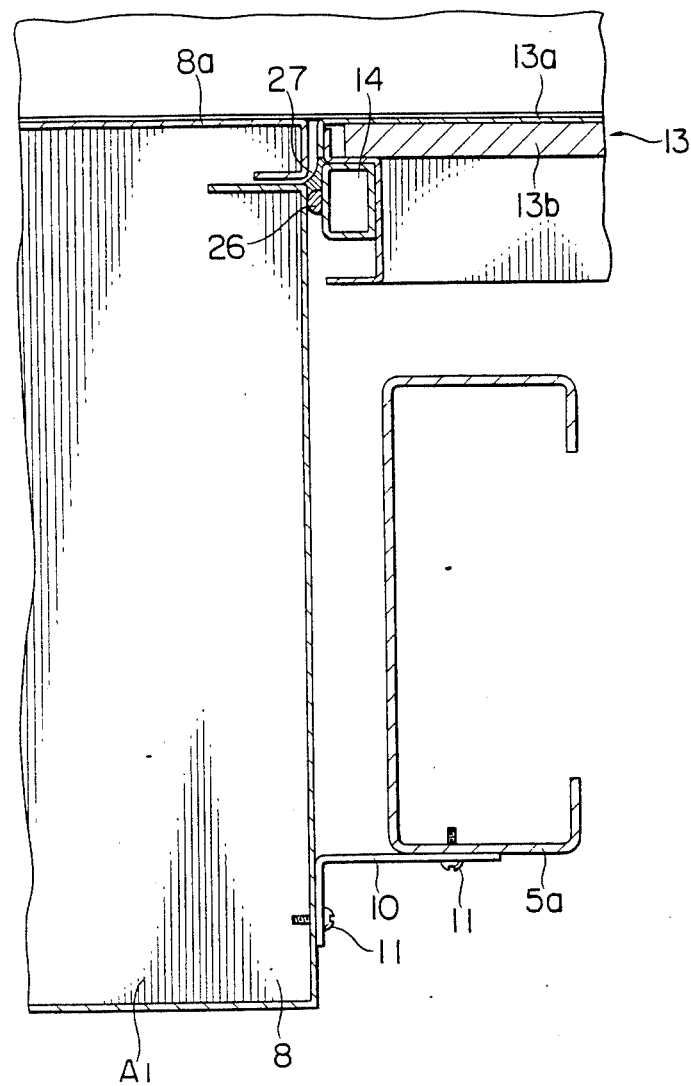
FIG. 10 is a cross section illustrating as enlarged the state of interconnection between the first air-conditioner unit and the frame.

The casing 8 is covered on the front side thereof (the lefthand side in FIG. 9) with a lower front panel 8a and an upper front panel 8b. The front panels are fastened in place with bolts 8c. An air inlet 8a1 is provided in the lower part of the lower front panel 8a and an air outlet 8b1 is provided in the upper front panel 8b. Inside the casing 8, a coarse dust filter 8d is set in place as juxtaposed closely to the rear part of the air inlet 8a1. A cooling coil 8e is attached fast to the rear part of this filter, an electric heater 8f is disposed above the coil, and a humidifier 8g is disposed diagonally above the heater. Further, an air blower 8h is disposed above the electric heater 8f and guide vanes 8i are disposed as closely juxtaposed to a discharge tube 8h1 of the air blower. The air flow discharged from the air blower 8h is rectified by these guide vanes and led to the air outlet 8b1. The air blower 8h comprises a blower casing of a small thickness, blades of a large area, and a motor of a low-speed rotation so as to abate the noise emitted during its operation. A HEPA (high efficiency penetration air) filter 8j is fastened to the rear side of the air outlet 8b1. Removal of the lower front panel 8a provides ready access to the filter 8d for its replacement or to the air blower 8h for its repair and removal of the upper front panel 8b permits access to the HEPA filter 8j for its replacement. The state of attachment of the casing 8 will be described. The casing 8 is secured on the bottom side thereof to a floor surface 9 (FIG. 4) with an anchor member (not shown) and on the lateral sides thereof to the vertical frames 5a of the frame 5 with fixing plates 10 and bolts 11 as illustrated in FIG. 10.

Figure 11:
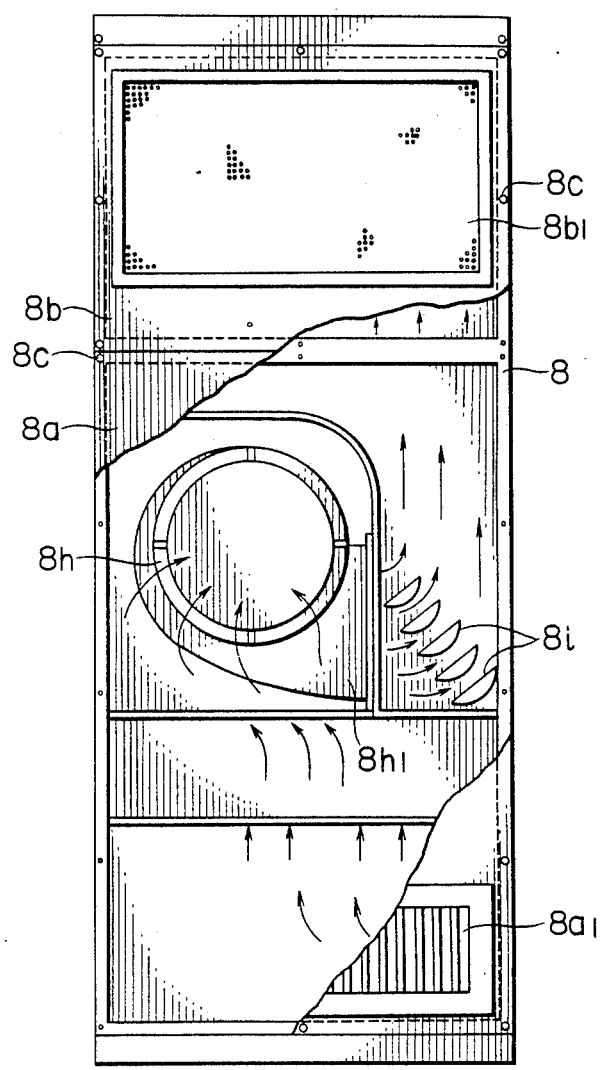
FIG. 11 is a partially cutaway front view of a second air-conditioner unit.
Figure 12:
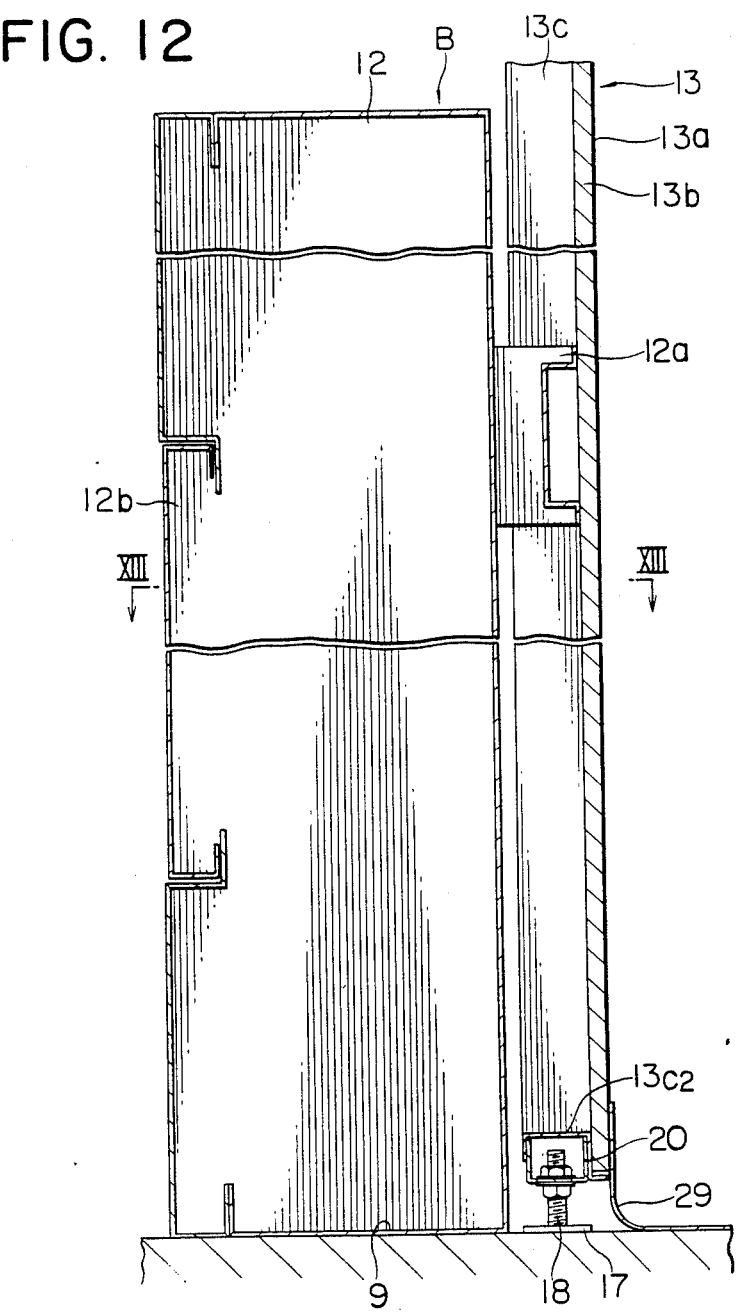
FIG. 12 is a longitudinal cross section illustrating as enlarged a control unit in a state erected upright.

The second air-conditioner unit A2 is substantially identical in principal features with the first air-conditioner unit A1 as illustrated in FIG. 11, except for the fact that it is not provided with the heat exchangers 8e, 8f and the humidifier 8g possessed by the first air-conditioner unit A1. The symbols used for denoting the component parts of the second air-conditioner A2 are equal to those used for denoting the identical component parts of the first air-conditioner A1. The manner in which the second air-conditioner unit is fixed in place is similar to that of the first air-conditioner unit already described.

Figure 13:
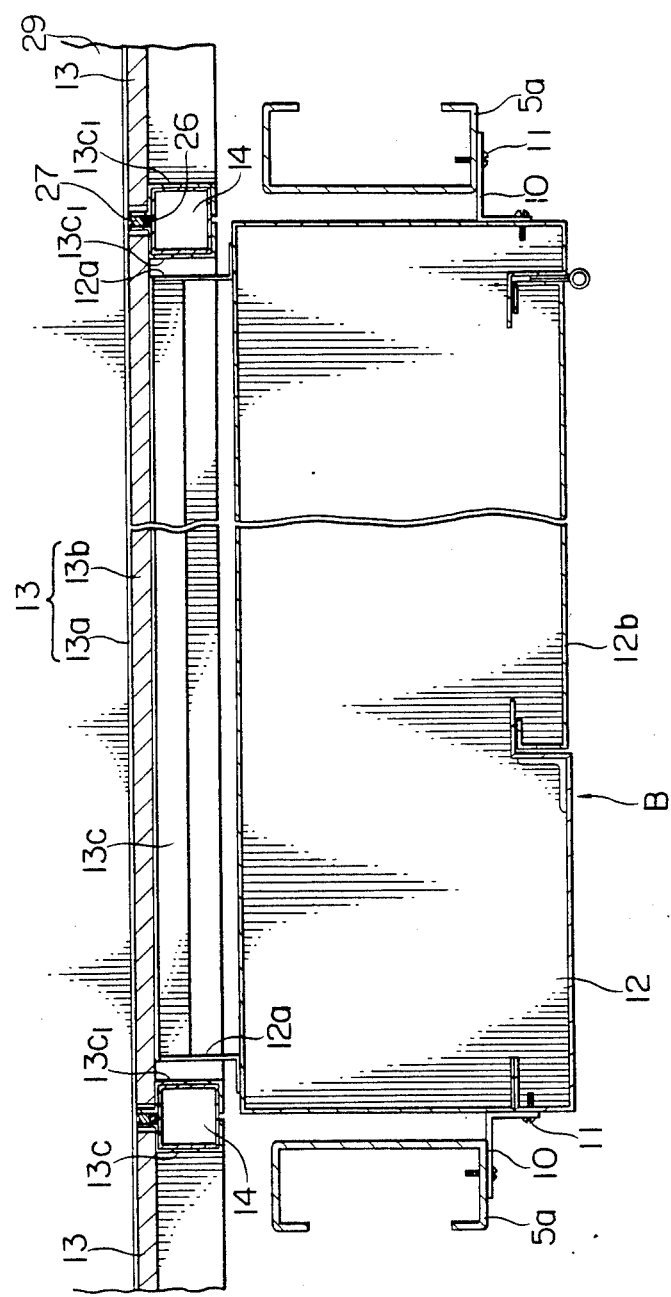
FIG. 13 is a cross section taken through FIG. 12 along the line XIII—XIII.

The control unit B, as illustrated in FIGS. 1 and 2 and FIGS. 12 and 13, is provided with a casing 12 which is substantially identical in size with the casing 8 for the air-conditioner units A1 and A2. By virtue of the control devices incorporated in the casing 12, the control unit fills the part of performing necessary electrical control on the air blower 8h and the heat exchangers 8e and 8f in the air-conditioner units A1 and A2 and on the air shower room 2a. Similarly to the air-conditioner units A1 and A2, the control unit B is set fast in place by having the lateral sides of the casing 12 thereof fastened to the vertical frames 5a of the frame 5 with fixing plates 10 and bolts 11 as illustrated in FIG. 13. The casing 12 is provided on the front side thereof with a plate 12a set in plate in a projected manner and on the rear side thereof with a rear lid 12b set in place in an openable state. Removal of the rear lid 12b provides ready access to the mechanical devices held inside for inspection.

The internal walls of the airtight main room 1 are formed of wall panels 13 and the front sides of the air-conditioner units A1 and A2 as illustrated in FIGS. 1 through 4.

Figure 14:
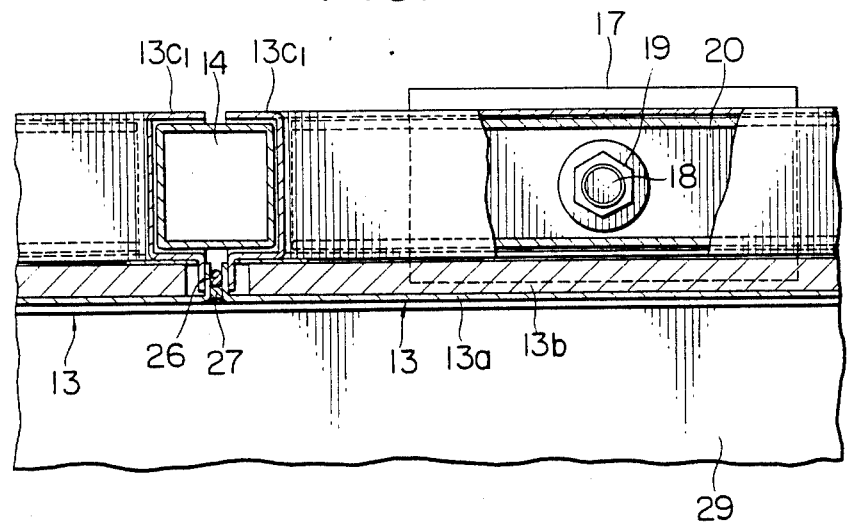
FIG. 14 is a lateral cross section of a joint part of a wall panel.
Figure 15:
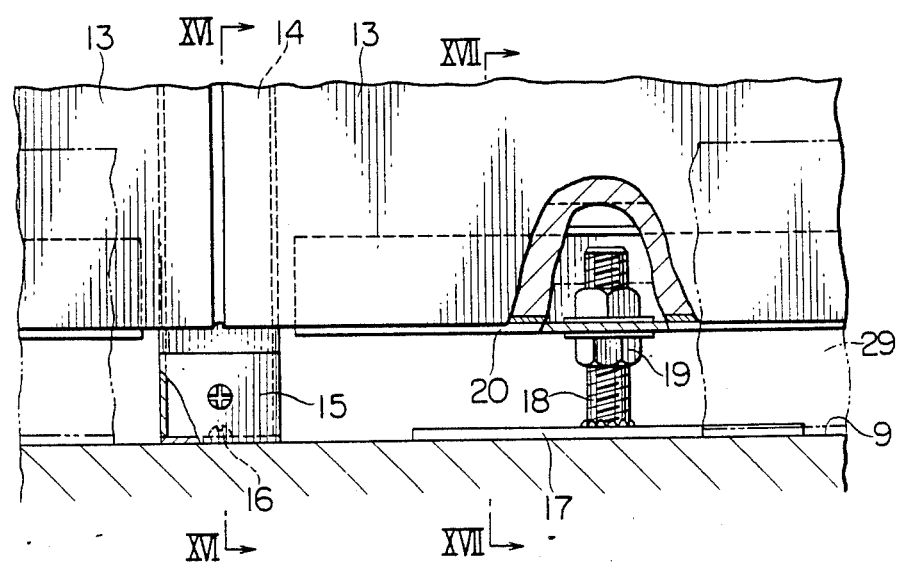
FIG. 15 is a partially cutaway front view illustrating the lower part of the joint part of the wall panel.
Figure 16:
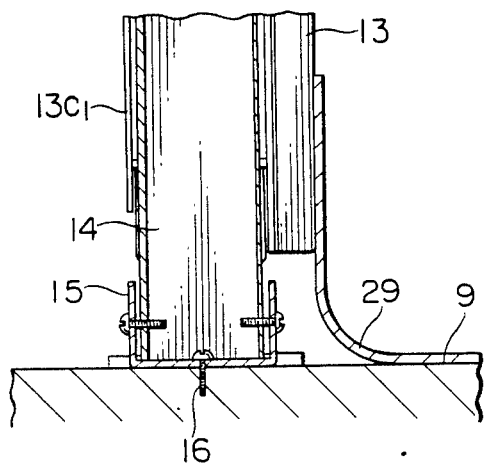
FIG. 16 is a cross section taken through FIG. 15 along the line XVI—XVI.
Figure 17:
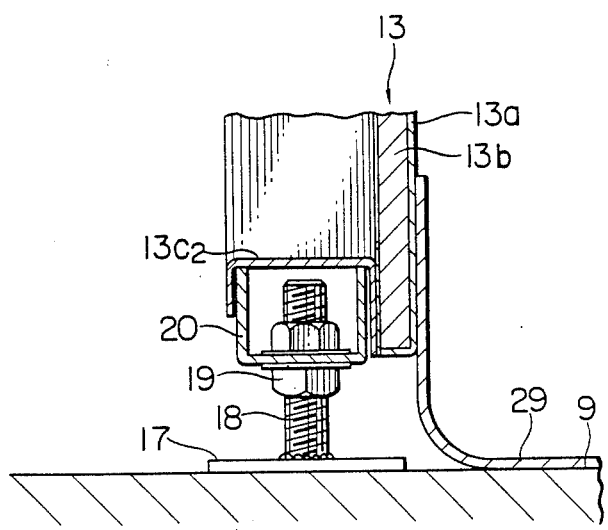
FIG. 17 is a cross section taken through FIG. 15 along the line XVII—XVII.
Figure 18:
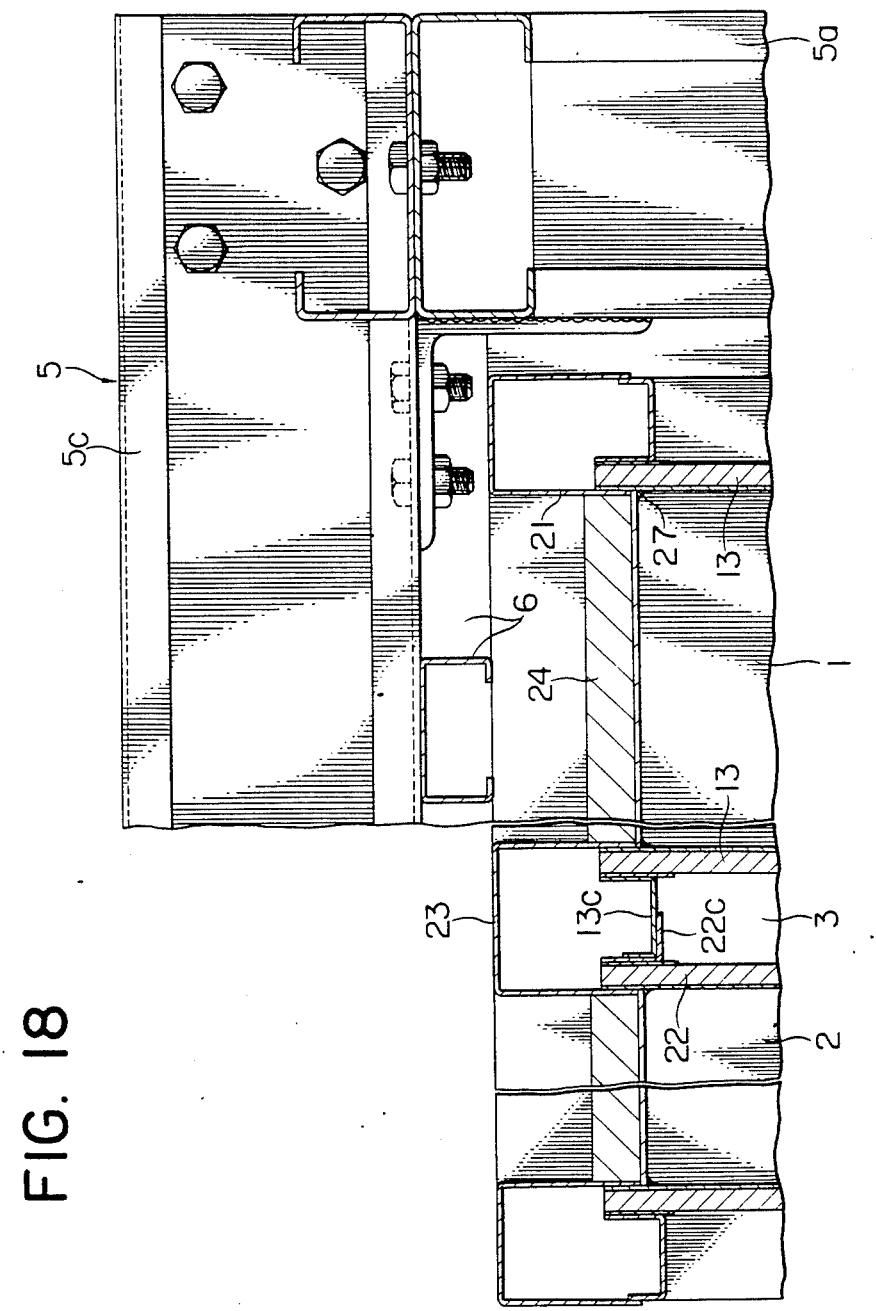
FIG. 18 is an enlarged cross section taken through FIG. 2 along the line XVIII—XVIII.

The construction of the internal walls on the lefthand and righthand sides of the airtight main room 1 as illustrated in FIG. 1 will be described. All the intervals between the vertical frames of the frames 5 except for those incorporating the air-conditioner units A1 and A2 are covered with wall panels 13. Each of the wall panels 13, as illustrated in FIG. 10 and FIGS. 13 through 17, is composed of a decorative steel panel 13a and a plaster board 13b bonded to the entire rear side of this steel panel. The wall panel 13 is reinforced with a reinforcing frame 13c which is formed of channel steel pieces laid around the boundary and in two horizontal levels in the center respectively of the rear side of the board 13b. Posts 14 are raised upright from the floor surface 9 in front of the vertical frames of each of the frames 5. The posts 14 are each formed of an angular pipe provided at the lower end thereof with a retainer metal piece 15 (FIGS. 15 and 16). The posts are immobilized on the floor surface by having the metal pieces 15 fastened to the floor surface 9 with bolts 16. Between the adjacent posts are incorporated the wall panels 13. Lateral reinforcing frames 13c1 fastened to the opposite sides of the posts 14 and to the opposite sides of the wall panels 13 serve to nip the posts fast in place and ensure stable lateral retention of the wall panels. The lower ends of the wall panels 13 are supported in plate, as illustrated in FIGS. 14, 15, and 17, on combination bases and receiver members 20 which are fastened with nuts 19 to support bolts 18 raised upright on seat plates 17 disposed on the floor surface 9. The wall panels 13 each correspond to two such support bolts 18. The receiver members 20 are each formed of a grooved steel piece and are attached fast in a horizontal state with the support bolts 18 and are adapted to receive the lower reinforcing frames 13c2 of the wall panels 13 in a mutually fitted state in the upper part thereof (FIG. 17). Desired adjustment of the wall panels 13 in their height is accomplished by causing the receiver members 20 to be vertically moved with the rotation of the nuts 19. The upper ends of the wall panels 13 are supported in place with long retainer members 21 of a U-shaped cross section as illustrated in FIG. 4 and FIG. 18.

Figure 2:
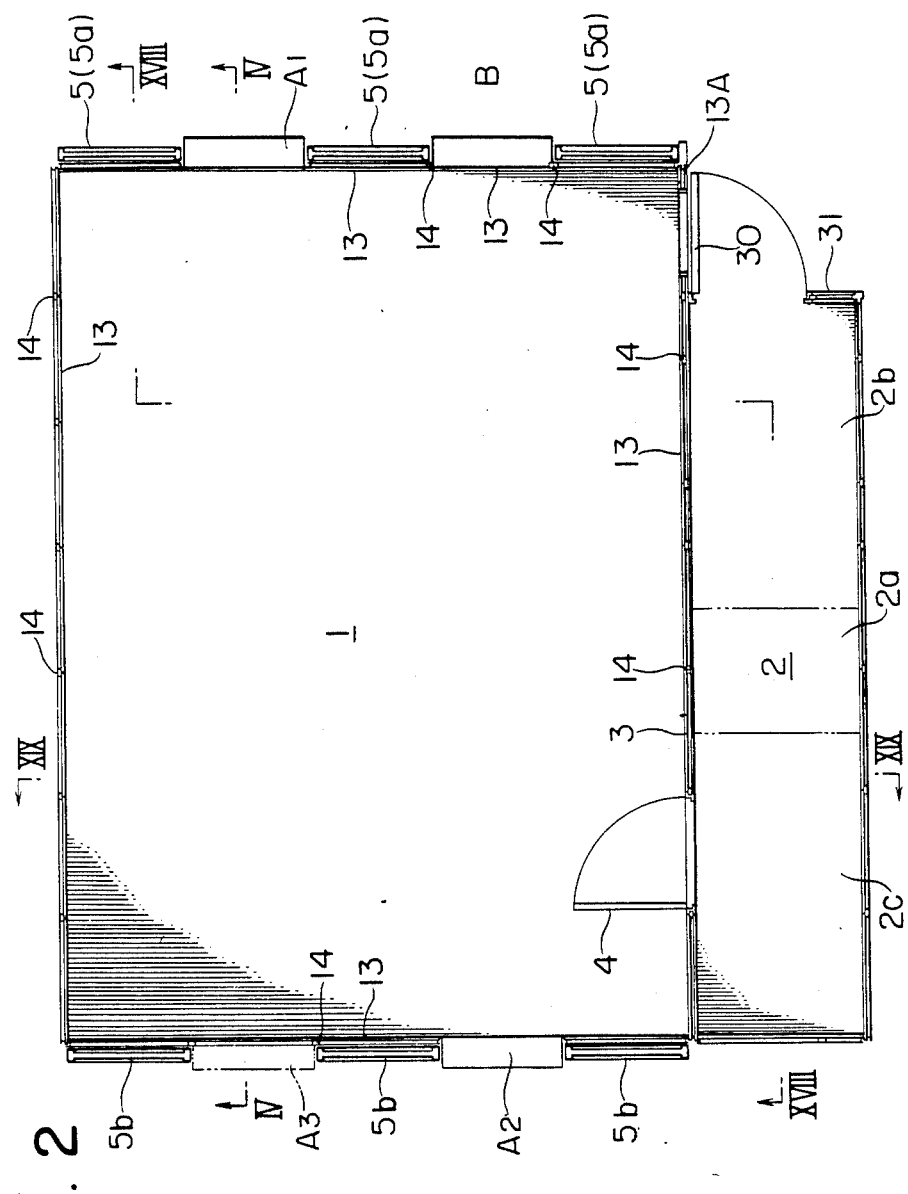
FIG. 2 is a lateral cross section.
Figure 3:
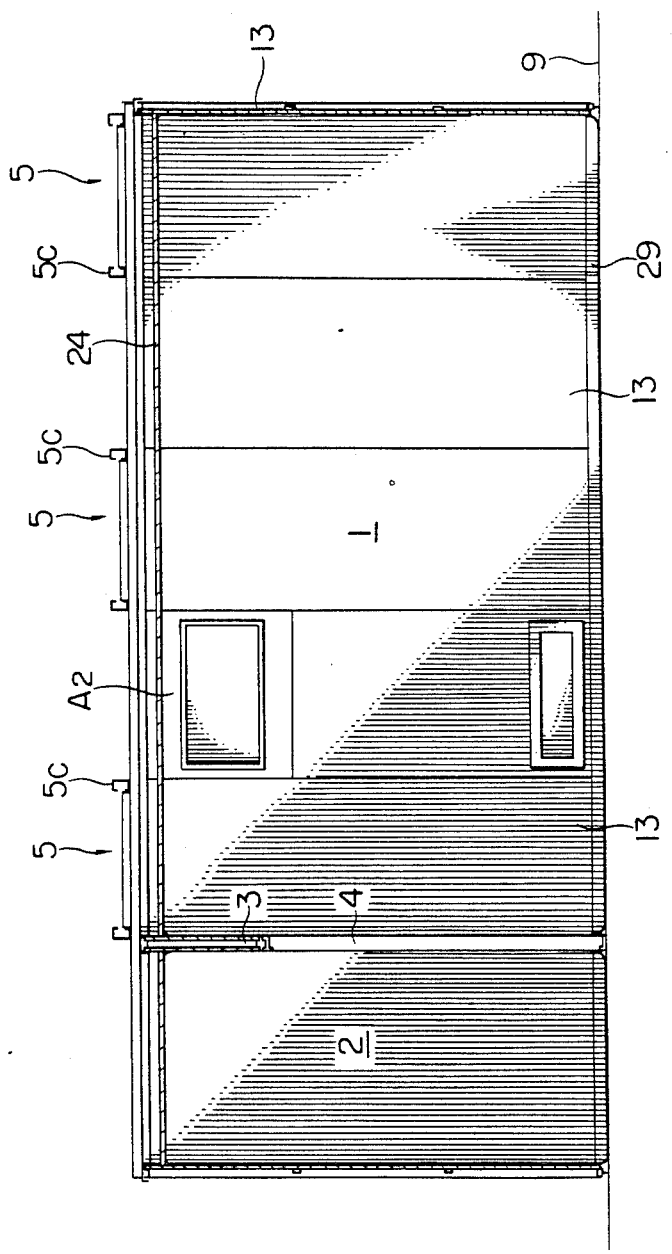
FIG. 3 is a cross section taken through FIG. 1 along the line III—III.
Figure 19:
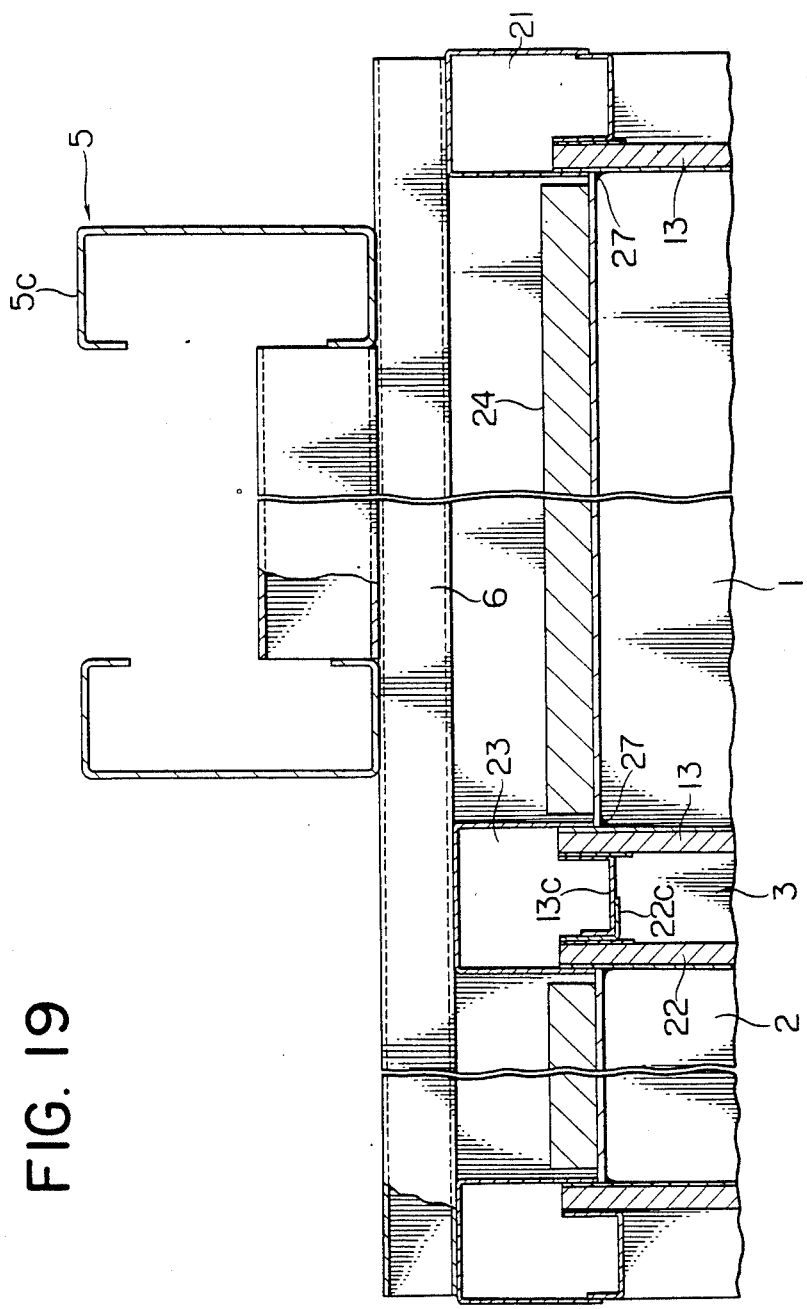
FIG. 19 is an enlarged cross section taken through FIG. 2 along the line XIX—XIX.
Figure 20:
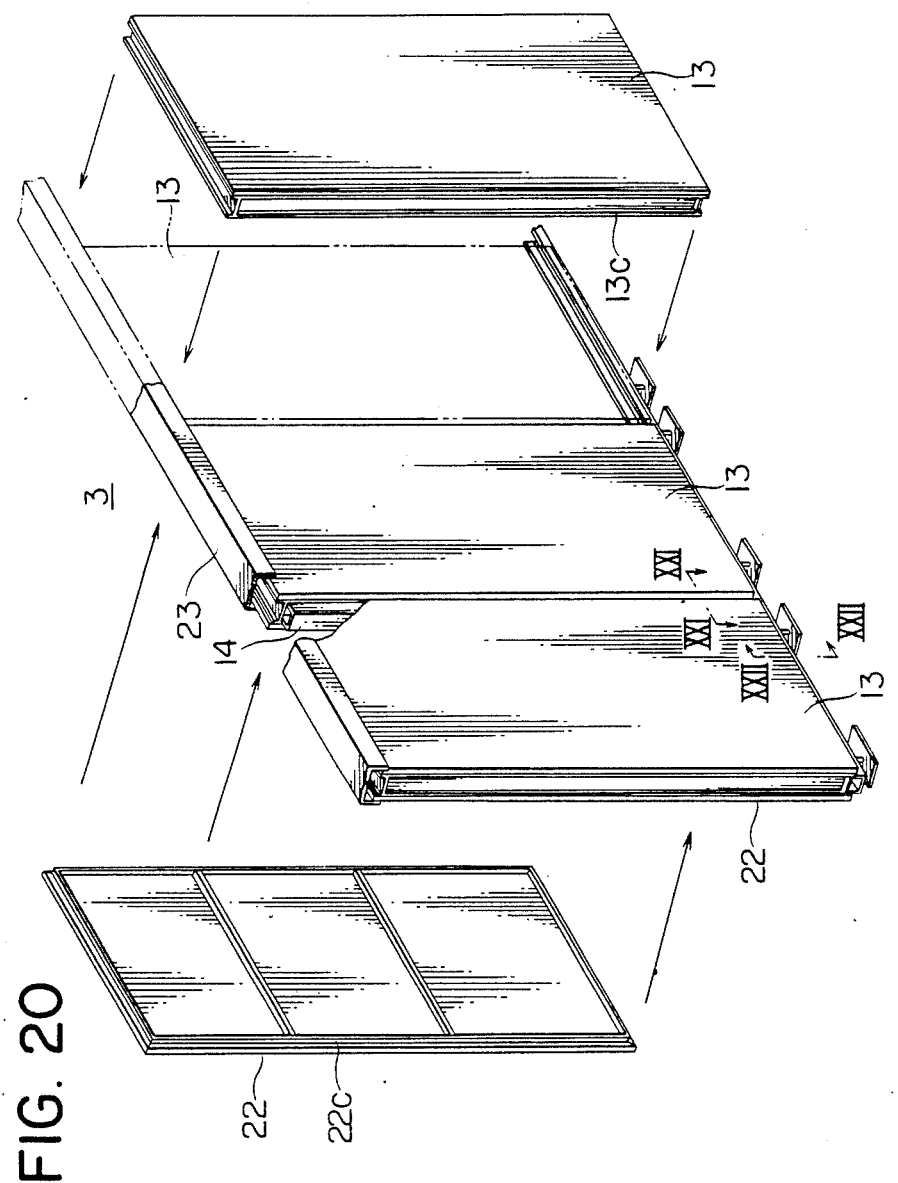
FIG. 20 is a perspective view of a partition wall in a partially disassembled state.
Figure 21:
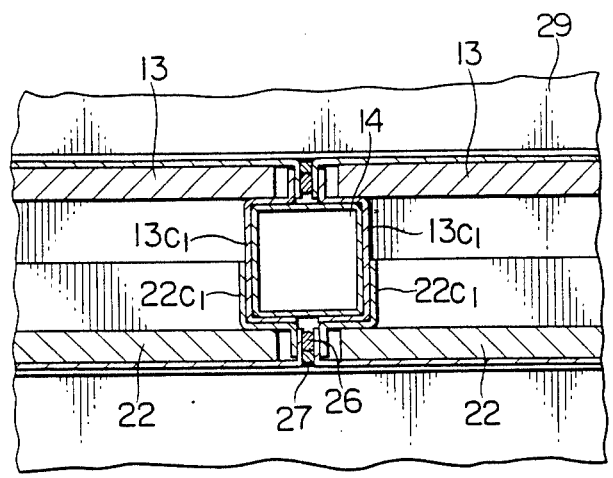
FIG. 21 is an enlarged cross section taken through FIG. 20 along the line XXI—XXI.
Figure 22:
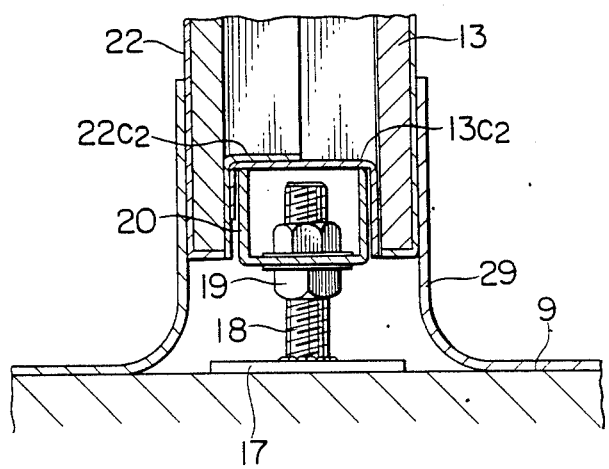
FIG. 22 is an enlarged cross section taken through FIG. 20 along the line XXII—XXII.

In the wall panels which cover the external sides of the airtight main room 1 as illustrated in FIGS. 2 and 19, the wall panels forming the internal walls as illustrated in FIG. 3 and on the righthand side of FIG. 19 are supported in place by a method substantially identical with the method adopted in supporting the wall panels on the same side as the air-conditioner unit A1. The wall panels 13 on the lefthand side and wall panels 22 of the preparatory room 2 jointly form a partition wall 3 for separating the airtight main room 1 and the preparatory room 2 from each other. The construction of the wall panels 22 is substantially identical with that of the wall panels 13, as illustrated in FIGS. 19 through 22. The wall panels 13 and 22 are fitted to each other through the medium of the reinforcing frames 13c and 22c. The lateral reinforcing frames 13c2 and 22c1 of these two panels serve to nip the posts 14 fixed in position as raised upright from the floor surface 9. The manner in which the posts 14 are fastened to the floor surface 9 is substantially identical with the manner for fastening the posts as already described (FIG. 16). The lower ends of the panels 13, 22 are supported in place by fitting the lower reinforcing frames 13c1 onto the combination bases and receiver members 20 secured to the bolts 18 as illustrated in FIG. 22. Denoted by 22c2 are lower reinforcing frames. By manipulation of the nuts 19, desired adjustment of the receiver members 20 in level can be accomplished. The upper ends of the panels 13, 22 are retained in place with retaining members 23 substantially identical in construction with the retaining members 21 (FIG. 18).

A ceiling panel 24 in the airtight main room 1 is made of glass wool sheets. As illustrated in FIG. 1 and FIGS. 18 and 19, retainer bars 25 serving to support in plate the ceiling panel 24 are supported by the bars 7 of the M-shaped cross section suspended from the long supporting members 6.

The method for tightly closing the airtight main room 1 is as follows. The gaps between the first airconditioner unit A1 and the wall panels 13 are sealed, as illustrated in FIG. 10, by filling the gaps between the lateral sides of the casing 8 and the posts 14 with elastic sealing members 27 laid in front of backup members. The gaps between the second air-conditioner unit A2 and the wall panels 13 are sealed in exactly the same manner as described above. The gaps along the joint lines between the adjoining wall panels 13 are sealed, as illustrated in FIGS. 13 and 14 and FIG. 21, by disposing elastic sealing members 27 and backup members 26 in these gaps. Further, the corner portion of the airtight main room 1 such as the gap occurring in the portion where the wall panel 13A containing a window (FIG.

Figure 23:
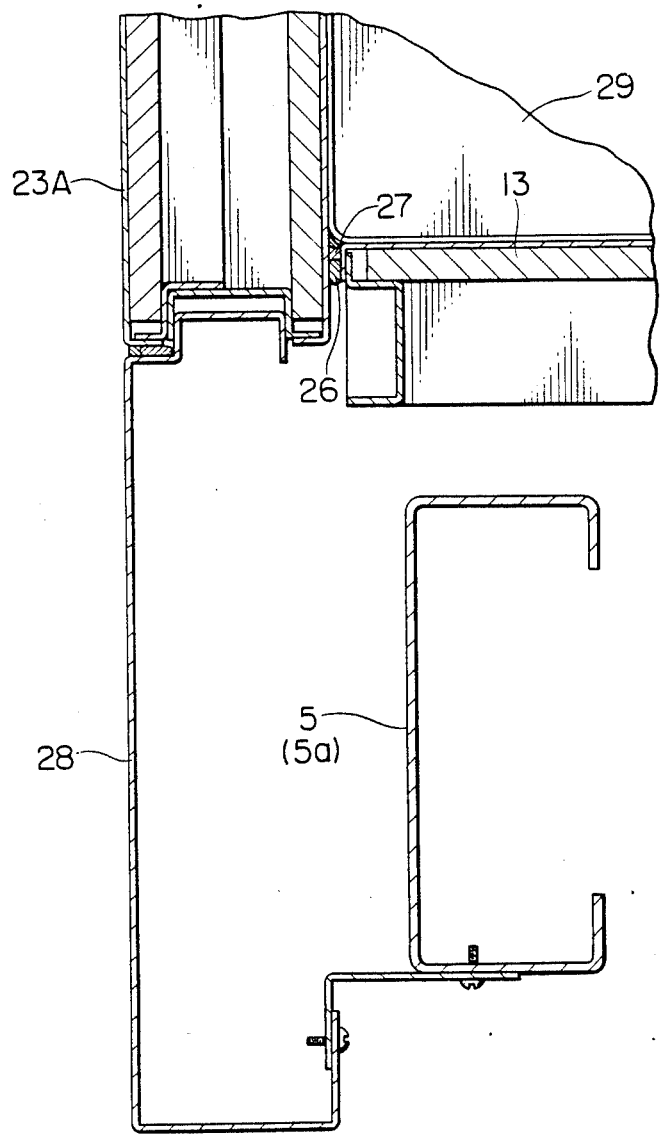
FIG. 23 is a lateral cross section illustrating as enlarged the state in which the corner portion of an airtight main room is set in place.

1) and the wall panel 13 intersect each other is sealed, as illustrated in FIG. 23, by disposing a backup member 26 and an elastic sealing member 27 between the lateral part of the wall panel and the front side of the lateral edge of the wall panel. By 28 is denoted a cover panel. The other portions are sealed in exactly the same manner as described above.

Then, the gap between the floor surface 9 and the lower end of the internal wall is sealed, as illustrated in FIGS. 3 and 4, FIG. 12, and FIGS. 14 through 17, by superposing a sealing sheet 29 of vinyl chloride on the entire upper surface of the floor surface 9 and bonding the boundary of the sheet 29 to the lower side of the internal wall. In this case, the boundary of the sheet 29 concurrently serves as a baseboard. The boundary of the ceiling panel 24 is likewise sealed with an elastic sealing member 27 as illustrated in FIGS. 18 and 19.

A wall 31 containing an entrance door 30 to the preparatory room 2 has the same construction as the partition wall 3. The other walls of the preparatory room 2 have substantially the same construction as the external walls opposed to the partition wall of the airtight main room 1.

Now, the method for assembling the clean room of this invention will be described below.

First, three frames 5 are set in place as regularly spaced on the floor surface 9 and the horizontal parts 5c of these frames are interconnected with continuous support members 6. Then, the posts 14 are set upright as regularly spaced along the vertical frames 5a, 5b of the frames 5 as illustrated in FIG. 2 and the other posts 14 are similarly set upright as regularly spaced between the opposed vertical frames 5a and 5b of the outermost frame. These posts have their lower ends fastened to the floor surface 9 with the bolts 16. Thereafter, the first air-conditioner unit A1 and the control unit B are built in between the prescribed vertical frames on the one vertical frame 5a side. On the other vertical frame 5b side, the second air-conditioner unit A2 is built in the space intervening the vertical frames and opposed to the control unit B. In this case, the air-conditioner unit A1 and the control unit B are not allowed to adjoin each other directly but must be disposed on both sides of one vertical frame 5a.

The support bolts 18 and the receiver members 20 are set in place on the floor surface 9 between the posts 14. After the posts have been set fast, the wall panels 13 are joined as inserted between the posts. The lower ends of the panels are mounted on the receiver members, the reinforcing frames 13c1 on the lateral parts are applied to the opposite sides of the posts, and the upper ends of the panels are supported by the retainer members 21, 23. Subsequently, the ceiling panel 24 is set up in a suspended manner and the sealing sheet 29 is superposed on the entire surface of the floor surface 9. The boundary of the sheet is bonded to the lower part of the internal wall. The interior of the airtight main room is tightly sealed by using the backup members 26 and the elastic sealing members 27. The assembly of the preparatory room 2 is carried out simultaneously with that of the airtight main room 1.

The clean room assembled as described above may be disassembled when necessary by reversing the procedure described above.

Now, the operation of the clean room of the present invention will be described below.

As the control unit B is set operating to actuate the air blower 8h, the heat exchangers 8e and 8f, and the humidifier 8g of the first air-conditioner unit A1 and the air blower 8h of the second air-conditioner unit A2, the air inside the airtight main room 1 is introduced into the casing 8 of the first air-conditioner unit A1 via the air inlet 8a1, advanced as indicated by the arrow in FIG. 1 through the filter 8d the cooling coil 8e, and the electric filter 8f, drawn into the air blower 8h and driven thereout in a forced flow of air, led upwardly by the guide vanes 8i, passed through the HEPA filter 8j and, now in the form of clean air, blown out horizontally into the room interior through the air outlet 8b1. The air, during its travel through the first air-conditioner unit is cooled by the cooling coil 8e or warmed by the electric heater 8f.

At the same time, the air inside the airtight main room 1 is sucked into the casing 8 of the second air-conditioner unit A2 via the air inlet 8a1 as indicated by the arrow in FIG. 11, cleaned with the HEPA filter 8j, and blown out horizontally into the room interior via the air outlet 8b1.

Figure 24:
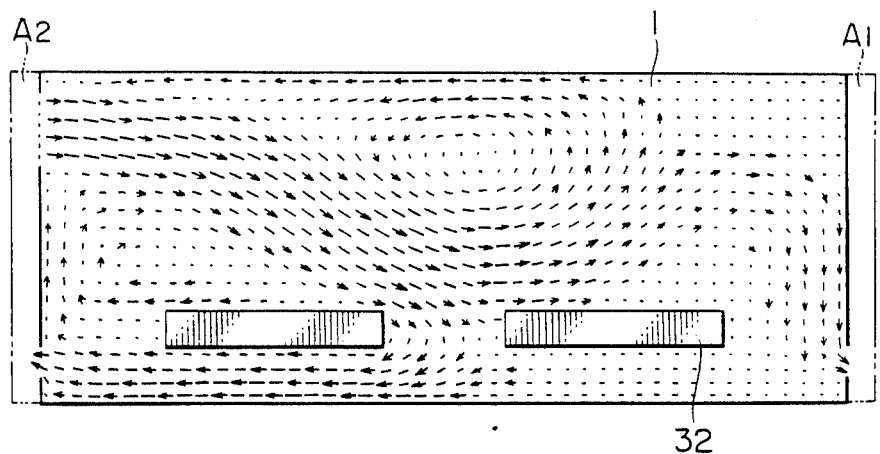
FIG. 24 is an explanatory diagram illustrating distribution of air flow inside the airtight main room.
Figure 25:
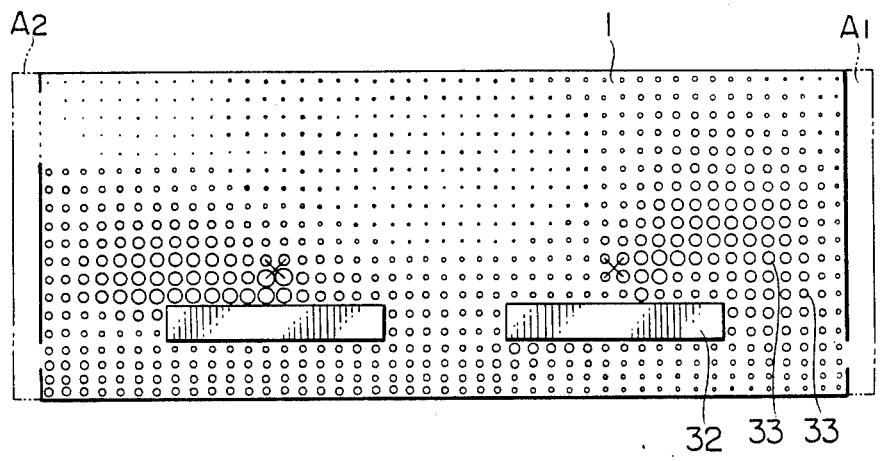
FIG. 25 is an explanatory diagram illustrating distribution of dust inside the airtight main room.

The air blown out of the second air-conditioner unit A2 flows inside the airtight main room 1 as indicated by the air flow distribution shown in FIG. 24. The dust density distribution inside the airtight main room 1 is shown in FIG. 25. By 32 is denoted a desk placed inside the main room 1 and by the mark X is denoted a source of dust. It is noted from the diagram that the air flow stagnates on the air-conditioner A1 side of the room interior. In FIG. 25, each circle 33 denotes a dust particle in such a way that its radius increases with the increasing size of dust particle. It is noted from the diagram that large dust particles are suspended near the dust source.

Figure 26:
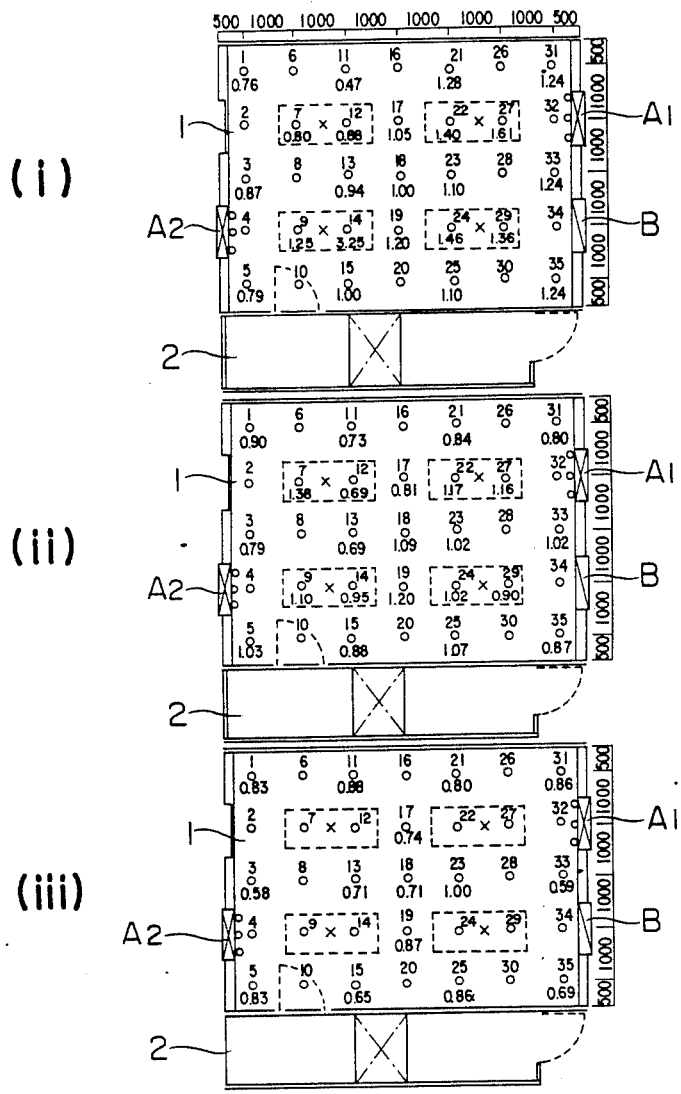
FIG. 26 is a diagram showing the numerical values of cleanliness within the airtight main room measured at three levels where the air circulation is effected by operation of one air-conditioner unit.
Figure 27:
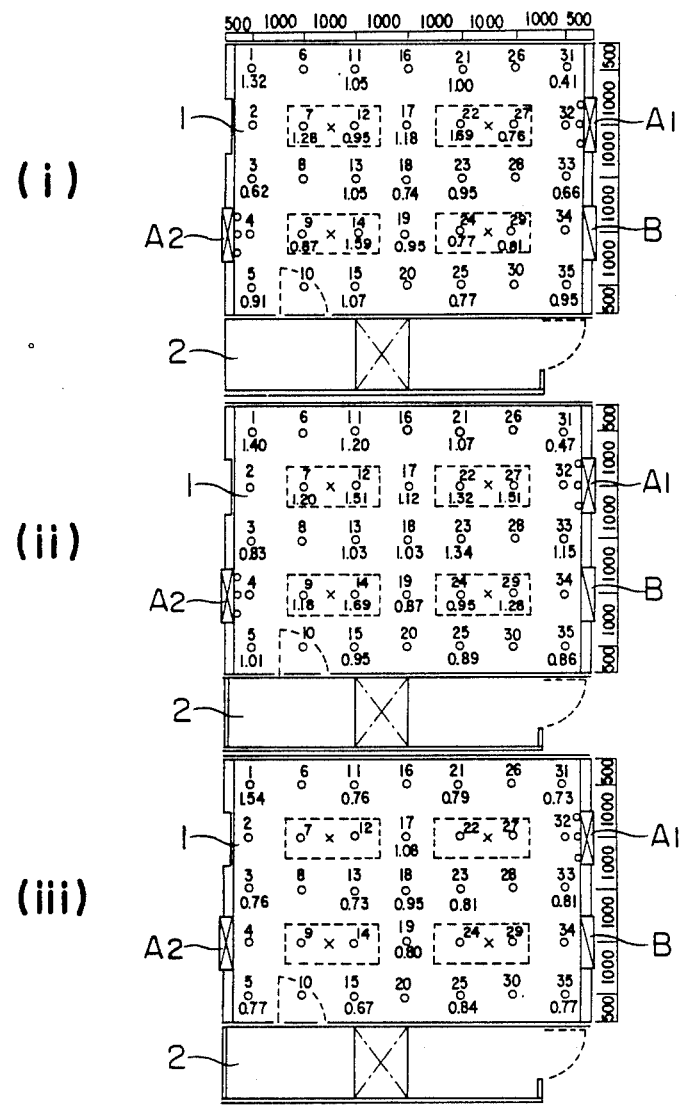
FIG. 27 is a diagram showing the numerical values of cleanliness within the airtight main room measured at three levels where the air circulation is effected by operation of two air-conditioner units.

The cleanliness inside the airtight main room 1 was measured at various points on the floor at three different levels of 1500 mm, 1000 mm, and 500 mm. The results are shown in FIGS. 26 and 27. The data of FIG. 26 were obtained when the air circulation inside the main room was effected by operating one air-conditioner unit. The data of FIG. 27 were obtained when the air circulation was effected by operating two air-conditioner units. As shown in the two diagrams, the cleanliness was measured at 35 points inside the airtight main room. These points of measurement are shown by circles "o", and identified with serial numbers 1~35, with found degrees of cleanliness indicated for the respective odd-numbered points. The mark X denotes the source of dust. First, FIG. 26 will be described. In this diagram, the degrees of cleanliness indicated at the points of measurement represent the results of measurement obtained when the air circulation inside the main room was effected by operating the air-conditioner unit A1 alone. FIG. 26 (i) represents the data of the measurement performed at the level of 1500 mm above the floor. From the data, it is noted that the cleanliness was Class 760 at the point 1 of measurement and Class 1100 at the point 25 of measurement. The average cleanliness of the main room was Class 1190. FIG. 26 (ii) represents the data of the measurement performed at the level of 1000 mm above the floor. The average cleanliness of the main room was Class 960. FIG. 26 (iii) represents the data of the measurement performed at the level of 500 mm above the floor. The average cleanliness was Class 770. At Point 25 of measurement, for example, the cleanliness was Class 860, the highest degree, at the level of 500 mm above the floor, Class 1070, the medium degree, at the level of 1000 mm, and Class 1100, the lowest degree, at the level of 1500 mm.

Now, FIG. 27 will be described. This diagram represents the data obtained when the air circulation in the main room was effected by operating the two air-conditioner units A1 and A2. FIG. 27 (i) represents the data of the measurement performed at the level of 1500 mm above the floor. The average cleanliness was Class 970. FIGS. 27 (ii) and (iii) represent the data of the measurement performed at the respective levels of 1000 mm and 500 mm above the floor. The average cleanliness was Class 1120 and Class b 850.

Comparison of the data of cleanliness obtained at the level of 1500 mm above the floor under operation of two air-conditioner units and those obtained at the same level under operation of one air-conditioner unit reveals that at Point 25 of measurement, for example, the cleanliness was Class 770 in the former case and Class 1100 in the latter case. This fact indicates that the cleanliness improves as the number of air-conditioner units increases and that still higher cleanliness is obtained by incorporating another air-conditioner unit A3 of the kind of the air-conditioner unit A2 in the space intervening between the vertical frames and opposed to the air-conditioner unit A1 as indicated by the chain line in FIG. 2.

The number of air-conditioner units to be incorporated in the clean room is suitably selected, depending on the span (distance between the vertical frame 5a and the vertical frame 5b) of the airtight main room, the degree of cleanliness desired, and the extent of dust generated. Where two or more air-conditioner units are required, the air-conditioner units A1 and A2 may be suitably combined and the humidifier 8g may be incorporated as occasion demands. Where no heat exchanger is required, incorporation of the air-conditioner unit A2 alone suffices. Although use of just one air-conditioner unit suffices for the primary purpose of the airtight main room, the cleanliness provided by the main room can be enhanced by using two such air-conditioner units. Then, use of two air-conditioner units as opposed to each other proves advantageous where the span of the airtight main room has a long span or where the clean room is required to provide cleanliness of high degree.

A desire to expand the airtight main room 1 is accomplished by extending the room 1 upwardly in the bearing thereof illustrated in FIG. 2. When this expansion is to be effected in the clean room illustrated in FIG. 2, for example, it is accomplished simply by having a fourth frame disposed at a distance of 1000 mm from the third frame (the framed situated in the uppermost part of the diagram of FIG. 2) as reckoned from the frame 5 on the preparatory room 2 side. When this expansion requires incorporation of additional air-conditioner unit or units, such unit or units may be installed in both or either of the spaces intervening between the third and fourth frames.

When the sealing sheet 29 is used as means of tightly closing the gap between the floor surface 9 and the internal wall of the airtight main room, desired airtight closure is attained with high reliability by a simple and speedy work.

Figure 28:
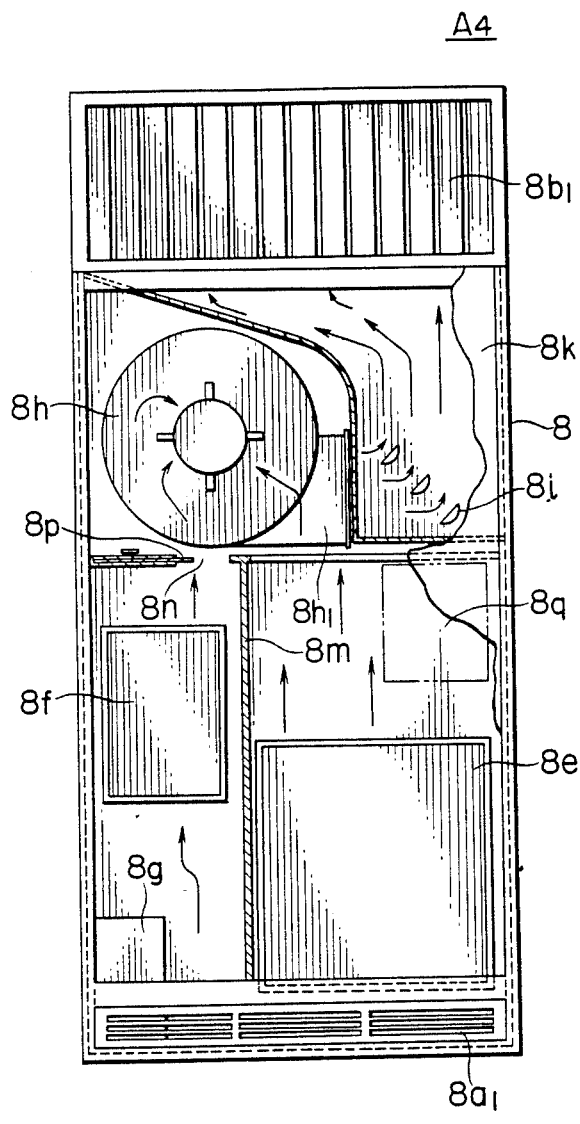
FIG. 28 is a partially cutaway front view of another version of the first air-conditioner unit.
Figure 29:
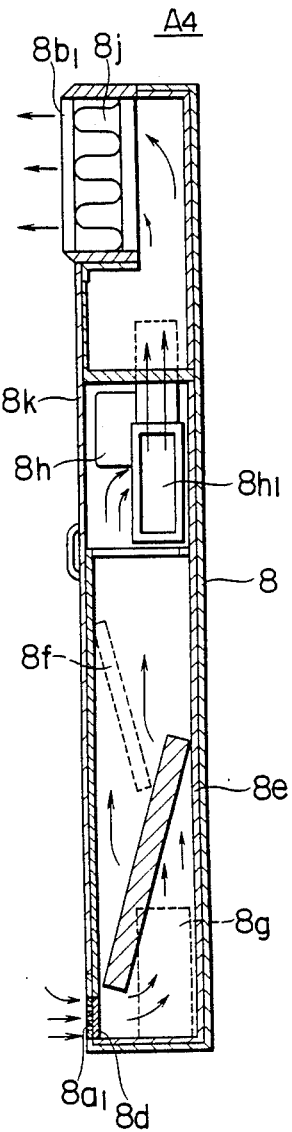
FIG. 29 is a longitudinal cross section of the unit illustrated in FIG. 28.

Another typical version of the air-conditioner unit A1 will be described with reference to FIGS. 28 and 29. An air-conditioner unit A4 is provided with functions substantially equal to the functions of the air-conditioner unit A1. It is provided in the central part of the front panel of the casing 8 thereof (the lefthand sided illustrated in FIG. 29) with a single-swing door 8k. The air inlet 8a1 is provided on the rear sided thereof with a coarse dust filter 8d and is adapted to be opened forward about a hinge (not shown) fitted at the lower edge thereof. By the filter 8j of the air outlet 8b1, the outgoing air flow is cleaned. On one side (lefthand side in FIG. 28) in the lower part of the interior of the casing 8, the humidifier 8g is disposed. On the other side is disposed the cooling coil 8e. The electric heater 8f is disposed above the humidifier. The humidifier 8g and the electric heater 8f are partitioned off the cooling coil 8e with a partition wall 8m as illustrated in FIG. 28. An opening 8n above the electric heater is opened or closed with a slide plate 8p. The air blower 8h is set in place above the electric heater. The mechanical items 8e through 8h are controlled by an operation panel 8q disposed inside the casing 8. Desired access to these mechanical items can be obtained by opening the door 8k. These mechanical items may be severally removed for the purpose of replacement. The humidifier 8g, the electric heater 8f, and the air blower 8h can be withdrawn forward from the casing and the cooling coil 8e can be withdrawn upwardly from its housing. In the present air-conditioner unit, the overall service life of the unit can be elongated because the mechanical items of varying service life can be replaced selectively from time to time. Thus, the unit can be given necessary maintenance easily. Since the operation panel 8q takes the place of the control unit B, the clean room has no use for the unit B.

Figure 30:
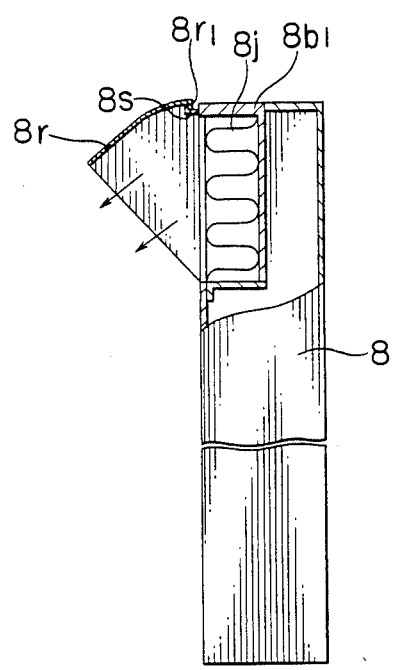
FIG. 30 is a cross section illustrating another version of the air outlet.

In the casing 8 illustrated in FIG. 30, a hood 8r is detachably attached to the front of the air outlet so that the direction in which the air flow is discharged from the air outlet 8b1 may be freely selected. The hood 8r is provided along the rear edge thereof with a hanging piece 8r1 and the air outlet 8b1 is provided on the upper front side thereof with a hook 8s, so that the hood 8r may be supported on the air outlet by having the hanging piece caught fast on the hook. Alternatively, the hood may be supported on the air outlet by allowing the hood to be tilted about a hinge provided at the lower part of the air outlet 8b1.

What we claim is:

1. A clean room for keeping clean interior air of an airtight main room by circulating the interior air through a circulation path and an air conditioner and filters disposed in the circulation path, which clean room comprises:

a plurality of gate-shaped frames disposed in prescribed directions and regularly spaced on a floor surface;

an air-conditioning unit built in at least one of the spaces between the adjacent vertical members of the gate-shaped frames a control unit built in one of the spaces between the adjacent vertical members other than the space occupied by the air-conditioning unit and adapted for controlling the air-conditioning unit, the air-conditioning unit being provided with an external casing of low thickness, the external casing having at the lower interior wall thereof an air inlet and at the upper interior wall thereof an air outlet fitted with a high-performance filter, the casing having therein an air blower, the air-blower being so adapted as to deliver forced air flow to the air outlet, and the control unit being disposed in a thin external casing for accommodating mechanical control items;

wall panels covering the spaces between the adjacent vertical members of the gate-shaped frames other than those occupied by the air-conditioning unit and the spaces between the vertical members of the gate-shaped frames and wall panels covering the exterior of the gate-shaped frames positioned outside the room;

a ceiling panel covering the upper open end of the room enclosed by the wall panels; and means for tightly sealing the clean room.

2. A clean room according to claim 1, wherein there are incorporated at least two air-conditioner units and one of the two air-conditioner units incorporates in the casing thereof a heat exchanger.

3. A clean room according to claim 2, wherein the two air-conditioner units are disposed at positions opposed to each other across the internal space of said room.

4. A clean room according to claim 1, wherein the means for tightly sealing the gaps between the lower end of the internal wall and the floor surface of the airtight main room is a sheet adapted to cover the gap and the floor surface entirely.

* * * * *